(12) United States Patent
Sano et al.

(10) Patent No.: US 6,486,275 B2
(45) Date of Patent: *Nov. 26, 2002

(54) PROCESS FOR PREPARING POLYOLEFINS

(75) Inventors: Akira Sano, Kawasaki (JP); Takeichi Shiraishi, Kawasaki (JP); Kunihiro Suzuki, Yokohama (JP); Hiroyuki Shimizu, Tokyo (JP); Kazuo Matsuura, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/844,902

(22) Filed: Apr. 27, 2001

(65) Prior Publication Data

US 2002/0013434 A1 Jan. 31, 2002

Related U.S. Application Data

(63) Continuation of application No. 08/906,656, filed on Aug. 7, 1997, now abandoned, which is a continuation of application No. 08/631,625, filed on Apr. 8, 1996, now abandoned, which is a continuation of application No. 07/839,396, filed on Feb. 20, 1992, now abandoned.

(30) Foreign Application Priority Data

Feb. 22, 1991 (JP) ............................................... 3-48643

(51) Int. Cl.$^7$ .......................... C08F 4/656; C08F 4/657; C08F 4/658
(52) U.S. Cl. ................... 526/124.4; 526/124.6
(58) Field of Search ........................... 526/124.4, 124.6

(56) References Cited

U.S. PATENT DOCUMENTS

| | | | |
|---|---|---|---|
| 3,701,766 A | 10/1972 | Delbouille et al. | |
| 4,154,915 A | 5/1979 | Matsuura et al. | |
| 4,396,534 A | 8/1983 | Matsuura et al. | |
| 4,613,581 A | 9/1986 | Maruyama et al. | |
| 4,732,882 A | * 3/1988 | Allen et al. | 502/104 |
| 5,463,001 A | * 10/1995 | Sano et al. | 526/124.5 |
| 5,506,183 A | * 4/1996 | Sano et al. | 526/124.6 |
| 5,804,679 A | * 9/1998 | Sano et al. | 526/124.5 |

FOREIGN PATENT DOCUMENTS

| | | |
|---|---|---|
| GB | 1292853 | 10/1972 |

* cited by examiner

*Primary Examiner*—D. R. Wilson
(74) *Attorney, Agent, or Firm*—Dilworth & Barrese, LLP

(57) ABSTRACT

A process for preparing polyolefins by polymerizing or copolymerizing an olefin or olefins in the presence of a catalyst comprising a solid catalyst component and an organometallic compound is provided.

24 Claims, No Drawings

PROCESS FOR PREPARING POLYOLEFINS

This application is a continuation of U.S. application Ser. No. 08/906,656, filed Aug. 7, 1997, now abandoned, which is a continuation of U.S. application Ser. No. 08/631,625, filed Apr. 8, 1996, now abandoned, which is a continuation of U.S. application Ser. No. 07/839,396, filed Feb. 20, 1992, now abandoned.

BACKGROUND OF THE INVENTION

The present invention relates to a process for preparing novel polyolefins. More particularly, the present invention is concerned with a process for preparing polyolefins of good particles having a large average particle diameter and a narrow molecular weight distribution, which process is capable of greatly increasing the polymer yield per solid and that per transition metal, thereby permitting the omission of the step of removing catalyst remaining in the resulting polymer, further capable of increasing the bulk density of the polymer and decreasing a fine particulate portion of the polymer.

Heretofore, in this technical field there have been known many catalysts comprising inorganic magnesium solids as carriers such as magnesium halide, magnesium oxide and magnesium hydroxide and a transition metal compound such as a titanium compound or a vanadium compound supported on the carriers. However, the polyolefins obtained in the prior art are generally low in bulk density, relatively small in average particle diameter and generally wide in particle size distribution so contain a large proportion of fine particles. Besides, when these powdery polymers are subjected to forming, there arise problems such as dusting and lowering of the forming, efficiency. For the reason, improvement has keenly been desired from the standpoint of productivity and polymer handling. Further, still further improvements are considered necessary in order to satisfy the recent keen desire for omitting the pelletizing step and using a powdery polymer directly in a processing machine.

The present inventors have previously found out a novel catalyst component with the above drawbacks remedied and already filed patent applications thereon (see Japanese Patent Publication Nos. 11651/1989 and 12289/1989 and Japanese Patent Laid Open Nos. 149605/1985, 32105/1987 and 207306/1987). The use of this catalyst component can afford a polymer having a high bulk density and a large average particle diameter. However, a further improvement has been considered necessary for omitting the pelletizing step and using a powdery polymer directly in a processing machine.

The present inventors have also proposed a catalyst capable of affording a polymer having a narrow molecular weight distribution and a reduced proportion of low molecular weight components, which is required particularly in the film field (see Japanese Patent Application No. 200348/1989). However, this polymer still cannot be considered satisfactory.

Having made extensive studies for the purpose of remedying such drawbacks and obtaining in an extremely high activity a polymer having a high bulk density, a narrow particle size distribution, an extremely small proportion of fine particles and a narrow molecular weight distribution, the present inventors accomplished the present invention.

SUMMARY OF THE INVENTION

More specifically, the present invention resides in a process for preparing a polyolefin by polymerizing or copolymerizing an olefin or olefins in the presence of a catalyst comprising a solid catalyst component and an organometallic compound, the solid catalyst component being prepared by the reaction of the following components [I], [II] and [III]:

[I] a reaction product obtained by the following components (1), (2) and (3) in the presence of a compound represented by the general formula $R^2OH$ wherein $R^2$ is a hydrocarbon radical having 1 to 20 carbon atoms or an organic residue containing such an element as oxygen, nitrogen, sulfur, or chlorine:

(1) a silicon oxide and/or an aluminum oxide;

(2) a reaction product obtained by reacting a magnesium halide and a compound represented by the general formula $[Me(OR)_nX_{z-n}]$ wherein Me represents an element of Groups I to IV in the Periodic Table, z represents the valence of the element Me, n is $0<n\leq z$, X is a halogen atom, and R is a hydrocarbon residue having 1 to 20 carbon atoms; and (3) a titanium compound represented by the general formula $Ti(OR^1)_mX_{4-m}$ wherein $R^1$ is a hydrocarbon radical having 1 to 20 carbon atoms, X is a halogen atom, and m is $0\leq m\leq 4$;

[II] an organoaluminum compound represented by the general formula $Al(OR^3)_pR^4_qX_{3-(p+q)}$ wherein $R^3$ and $R^4$, which may be the same or different, are each a hydrocarbon residue having 1 to 24 carbon atoms, X is a halogen atom or hydrogen atom, and p and q are $0\leq p<3$, and $0\leq q\leq 3$, provided $0<p+q\leq 3$; and

[III] a silicon compound represented by the general formula $[R^5_aR^6_bR^7_cSi(OR^8)_dX_{4-(a+b+c+d)}]$ where $R^5$, $R^6$, $R^7$ and $R^8$, which may be the same or different, are each a hydrocarbon residue having 1 to 20 carbon atoms, X is a halogen atom, and a, b, c and d are $0\leq a<4$, $0\leq b<4$, $0\leq c<4$ and $0<d\leq 4$, provided $0<a+b+c+d\leq 4$.

By the process of the present invention there is obtained, in extremely high activity, a polyolefin having a relatively large average particle diameter, a narrow particle size distribution, a reduced proportion of fine particles and a narrow molecular weight distribution. Besides, the bulk density and free fluidity of the polyolefin are high. These characteristics are very advantageous to the polymerization operation.

Further, the polyolefin prepared by the process of the present invention can be subjected to forming not only as pellets but also in the form of powder, without causing any trouble.

It is also a characteristic feature of the present invention that the polymer obtained using the catalyst specified in the present invention is extremely narrow in its molecular weight distribution and small in the amount thereof extracted in hexane, and that the amount of low grade polymers by-produced is very small. Therefore, when film is formed using the polyolefin of a narrow molecular weight distribution prepared by the process of the present invention, it has a lot of merits, for example, high strength and transparency, superior anti-blocking property and heat-sealability.

DETAILED DESCRIPTION OF THE INVENTION

The present invention will be described concretely hereinunder.

The catalyst used in the polyolefin preparing process of the present invention comprises a solid catalyst component and an organometallic compound, the said solid catalyst component being prepared from the following components [I], [II] and [III]:

[I] a reaction product obtained by the following components (1), (2) and (3) in the presence of a compound represented by the general formula $R^2OH$ wherein $R^2$ is a hydrocarbon radical having 1 to 20 carbon atoms or an organic residue containing such an element as oxygen, nitrogen, sulfur, or chlorine:

(1) a silicon oxide and/or an aluminum oxide;

(2) a reaction product obtained by reacting a magnesium halide and a compound represented by the general formula $[Me(OR)_nX_{z-n}]$ wherein Me represents an element of Groups I to IV in the Periodic Table, z represents the valence of the element Me, n is $0<n\leq z$, X is a halogen atom, and R is a hydrocarbon residue having 1 to 20 carbon atoms; and (3) a titanium compound represented by the general formula $Ti(OR^1)_mX_{4-m}$ wherein $R^1$ is a hydrocarbon radical having 1 to 20 carbon atoms, X is a halogen atom, and m is $0\leq m\leq 4$;

[II] an organoaluminum compound represented by the general formula $Al(OR^3)_pR^4_qX_{3-(p+q)}$ wherein $R^3$ and $R^4$, which may be the same or different, are each a hydrocarbon residue having 1 to 24 carbon atoms, X is a halogen atom or hydrogen atom, and p and q are $0\leq p<3$, and $0\leq q\leq 3$, provided $0<p+q\leq 3$; and

[III] a silicon compound represented by the general formula $[R^5_aR^6_bR^7_cSi(OR^8)_dX_{4-(a+b+c+d)}]$ where $R^5$, $R^6$, $R^7$ and $R^8$, which may be the same or different, are each a hydrocarbon residue having 1 to 20 carbon atoms, X is a halogen atom, and a, b, c and d are $0\leq a<4$, $0\leq b<4$, $0\leq c<4$ and $0<d\leq 4$, provided $0<a+b+c+d\leq 4$.

<1>Solid Catalyst Component

1. Component [I]

(1). The silicon oxide used in the present invention is silica or a double oxide of silicon and at least one another metal selected from Groups VII of the Periodic Table.

The aluminum oxide used as component (1) in the present invention is alumina or a double oxide of aluminum and at least one another metal selected from Group I to VIII in the Periodic Table.

As typical examples of the double oxide of silicon or aluminum and at least one another metal selected from Group VII in the Periodic Table there are mentioned various natural and synthetic double oxides such as $Al_2O_3 \cdot MgO$, $Al_2O_3 \cdot CaO$, $Al_2O_3 \cdot SiO_2$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$, and $SiO_2 \cdot MgO$. It is to be noted that these formulae are not molecular formulae but represent only compositions and that the structure and component ratio of the double oxide used in the present invention are not specially limited thereby. It goes without saying that the silicon oxide and/or aluminum oxide used in the present invention may have a small amount of water absorbed therein or may contain a small amount of impurities.

Although the properties of the silicon oxide and/or aluminum oxide used in the present invention are not specially limited so far as the objects of the present invention are not adversely affected thereby, a silica having a particle diameter of 1 to 200 μm, an average pour volume of greater than 0.3 ml/g and a surface area of greater than 50 m²/g is preferred. Also, it is preferably calcined at 200–800° C. prior to use.

(2). As the magnesium halide there is used a substantially anhydrous one. Examples are magnesium dihalides such as magnesium fluoride, magnesium chloride, magnesium bromide, and magnesium iodide, with magnesium chloride being particularly preferred.

These magnesium halides may have been treated with electron donors such as alcohols, esters, ketones, carboxylic acids, ethers, amines, and phosphines.

As examples of the compound of the general formula $Me(OR)_nX_{z-n}$ used in the present invention wherein Me represents an element of Groups Ia to IVa in the Periodic Table, z represents the valence of the element Me, n is $0<n\leq z$, X is a halogen atom, and R is a hydrocarbon residue preferably radical, having 1 to 20, preferably 1 to 8, carbon atoms such as, for example, alkyl, aryl, or aralkyl, and Rs may be the same or different, there are mentioned compounds represented by NaOR, $Mg(OR)_2$, $Mg(OR)X$, $Ca(OR)_2$, $Zn(OR)_2$, $Cd(OR)_2$, $B(OR)_3$, $Al(OR)_3$, $Al(OR)_2X$, $Al(OR)X_2$, $Si(OR)_4$, $Si(OR)_3X$, $Si(OR)_2X_2$, $Si(OR)X_3$, and $Sn(OR)_4$. More concrete and preferred examples are $Mg(OC_2H_5)_2$, $Mg(OC_2H_5)Cl$, $Al(OCH_3)_3$, $Al(OC_2H_5)_3$, $Al(On-C_3H_7)_3$, $Al(Oi-C_3H_7)_3$, $Al(On-C_4H_9)_3$, $Al(Osec-C_4H_9)_3$, $Al(Ot-C_4H_9)_3$, $Al(OCH_3)_2Cl$, $Al(OC_2H_5)_2Cl$, $Al(OC_2H_5)Cl_2$, $Al(Oi-C_3H_7)_2Cl$, $Al(Oi-C_3H_7)Cl_2$, $Si(OC_2H_5)_4$, $Si(OC_2H_5)_3Cl$, $Si(OC_2H_5)_2Cl_2$, $Si(OC_2H_5)Cl_3$, $Si(OCH_2C_6H_5)_4$, $B(OCH_3)_3$, $B(OC_2H_5)_3$, $B(On-C_4H_9)_3$ and the like. It is preferable that the reaction ratio of the compound of the general formula $Me(OR)_nX_{z-n}$ to the magnesium halide is in the range of 0.01 to 10, preferably 0.1 to 5 in terms of Me/Mg (molar ratio).

The method of reaction between the magnesium halide and the compound of the general formula $Me(OR)_nX_{z-n}$ is not specially limited. There may be adopted a method in which both components are co-pulverized using, for example, ball mill, vibration mill, rod mill, or impact mill, at a temperature of 0° to 200° C., for 30 minutes to 50 hours, in the presence or absence of an inert hydrocarbon solvent. Or there may be adopted a method in which both components are mixed and reacted together under heating at a temperature of 20° to 400° C., preferably 50° to 300° C., for 5 minutes to 10 hours, in an organic solvent selected from inert hydrocarbons, alcohols, phenols, ethers, ketones, esters, nitriles and mixtures thereof, and thereafter the solvent is evaporated off. The method of co-pulverizing the two is preferred in the present invention.

(3). As examples of the titanium compound of the general formula $Ti(OR^1)_mX_{4-m}$ used in the present invention wherein $R^1$ is a hydrocarbon radical having 1 to 20, preferably 1 to 12, carbon atoms such as an alkyl, aryl or aralkyl group, X is a halogen atom, and n is $0\leq m\leq 4$, there are mentioned titanium tetrahalides such as titanium tetrachloride, titanium tetrabromide and titanium tetraiodide, monomethoxytrichlorotitanium, dimethoxydichlorotitanium, trimethoxymonochlorotitanium, tetramethoxytitanium, monoethoxytrichlorotitanium, monoethoxytrifluorotitanium, monoethoxytribromotitanium, diethoxydifluorotitanium, diethoxydichlorotitanium, diethoxydibromotitanium, triethoxyfluorotitanium, triethoxychlorotitanium, tetraethoxytitanium, monopropoxytrichlorotitanium, monoisopropoxytrichlorotitanium, dipropoxydichlorotitanium, diisopropoxydichlorotitanium, diisopropoxydibromotitanium, tripropoxyfluorotitanium, tripropoxychlorotitanium, tetra-n-propoxytitanium, tetraisopropoxytitanium, monobutoxytrichlorotitanium, monoisobutoxytrichlorotitanium, dibutoxydichlorotitanium, diisopropoxydichlorotitanium, tributoxyfluorotitanium, tributoxychlorotitanium, triisobutoxychlorotitanium, tetra-n-butoxytitanium, tetraisobutoxytitanium, tetra-sec-butoxytitanium, tetra-tert-butoxytitanium, monopentyloxytrichlorotitanium, dipentyloxydichlorotitanium, tripentyloxymonochlorotitanium, tetra-n-pentyloxytitanium, tetra-cyclopentyloxytitanium, monooctyloxytrichlorotitanium, dioctyloxydichlorotitanium, trioctyloxymonochlorotitanium, tetra-n-hexyloxytitanium, tetra-cyclohexyloxytitanium, tetra-n-heptyloxytitanium, tetra-n-octyloxytitanium, mono-2-ethylhexyloxytrichlorotitanium, di-2-ethylhexyloxydichlorotitanium, tri-2-ethylhexyloxymonochlorotitanium, tetranonyloxytitanium, tetradecyloxytitanium, tetraisobornyloxytitanium, tetraoleyloxytitanium, tetraallyloxytitanium, tetrabenzyloxytitanium, tetrabenzhydryloxytitanium, monophenoxytrichlorotitanium, diphenoxydichlorotitanium, triphenoxychlorotitanium, tri-o-xylenoxychlorotitanium, tetraphenoxytitanium, tetra-o-methylphenoxytitanium, tetra-m-methylphenoxytitanium, tetra-1-naphthyloxytitanium, tetra-2-naphthyloxytitanium and mixtures thereof. Among them, particularly, titanium tetrachloride, monoethoxytrichlorotitanium, diethoxydichlorotitanium, monobutoxytrichlorotitanium, dibutoxydichlorotitanium, tetraethoxytitanium, tetraisopropoxytitanium, tetra-n-butoxytitanium, tetra-n-hexyloxytitanium, tetra-n-octyloxytitanium and tetra-2-ethylhexyloxytitanium are preferred.

(4) The component [I] used in the present invention is prepared by reacting together (1) a silicon oxide and/or an aluminum oxide (component [I]-(1)), (2) a reaction product obtained by the reaction of a magnesium halide and a compound of the general formula $Me(OR)_nX_{z-n}$ (component [I]-(2)) and (3) a titanium compound of the general formula $Ti(OR^1)_mX_{4-m}$ (component [I]-(3)) in the presence of a compound of the general formula $R^2OH$.

Compounds of the general formula $R^2OH$ are those wherein $R^2$ is a hydrocarbon radical having 1 to 20, preferably 6 to 12, carbon atoms, or an organic residue containing such an element as oxygen, nitrogen, sulfur, or chlorine. Preferred examples of such hydrocarbon radical are alkyl, alkenyl, aryl and aralkyl. Particularly preferred are those having a branch structure. As examples of the compound of the general formula $R^2OH$ there are mentioned 1-hexanol, 2-methyl-1-pentanol, 4-methyl-1-pentanol, 4-methyl-2-pentanol, 2-ethyl-1-butanol, 1-heptanol, 2-pentanol, 3-heptanol, 4-heptanol, 2,4-dimethyl-3-pentanol, 1-octanol, 2-octanol, 2-ethyl-1-hexanol, 3,5-dimethyl-1-hexanol, 2,2,4-trimethyl-1-pentanol, 1-nonanol, 5-nonanol, 3,5-dimethyl-4-heptanol, 2,6-dimethyl-4-heptanol, 3,5,5-trimethyl-1-hexanol, 1-decanol, 1-undecanol, 1-dodecanol, 2,6,8-trimethyl-4-nonanol, 1-tridecanol, 1-pentadecanol, 1-hexadecanol, 1-heptadecanol, 1-octadecanol, 1-nonadecanol, 1-eicosanol, phenol, chlorophenol, benzyl alcohol, methyl cellosolve, and mixtures thereof. Particularly, 2-methyl-1-pentanol, 4-methyl-1-pentanol, 4-methyl-2-pentanol, 2-ethyl-1-butanol, 2,4-dimethyl-3-pentanol, 2-ethyl-1-hexanol, 3,5-dimethyl-1-hexanol, 2,2,4-trimethyl-1-pentanol, 3,5-dimethyl-4-heptanol, 2,6-dimethyl-4-heptanol and 3,5,5-trimethyl-1-hexanol are preferred.

It goes without saying that methanol commercially available as industrial grade alcohol or other modified alcohols such as hexane-modified alcohols may also be used without any trouble.

How to react the components [I]-(1) to [I]-(3) in the preparation of component [I] is not specially limited if only the reaction is conducted in the presence of a compound of the general formula $R^2OH$. These components may be reacted with one another in any of the following orders:

(A) Components [I]-(1) to [I]-(3) are contacted at a time.
(B) Components [I]-(1) and [I]-(2) are contacted together, followed by contact with component [I]-(3).
(C) Components [I]-(1) and [I]-(3) are contacted together, followed by contact with component [I]-(2).
(D) Components [I]-(2) and [I]-(3) are contacted together, followed by contact with component [I]-(1). The above method (D) is preferred. More preferably, components [I]-(2) and [I]-(3) are dissolved and contacted together in advance, using a compound of the general formula $R^2OH$ as a solvent, followed by contact with component [I]-(1). In what order the components [I]-(2) and [I]-(3) should be dissolved in the compound of the general formula $R^2OH$ is not specially limited. Both may be dissolved at a time, or one may precedes the other.

There also may be adopted the following method. Component [I]-(2) and/or component [I]-(3) are (is) dissolved beforehand in a compound smaller in the number of carbon atom than the compound of the general formula $R^2OH$, namely a compound having 1 to 5 carbon atoms, which is a so-called lower alcohol, and thereafter the components to be reacted are contacted together using the lower alcohol solution containing the component [I]-(2) and/or the component [I]-(3) and in the presence of the compound of the general formula $R^2OH$.

According to a preferred method of contacting the components [I]-(1) to [I]-(3), these components are contacted, mixed and reacted in accordance with any of the foregoing contacting orders at a temperature of 20–300° C., preferably 50–150° C., for 1 minute to 48 hours, preferably 1 to 5 hours, in the presence of a compound of the general formula $R^2OH$, and thereafter the compound of the general formula $R^2OH$ is removed by the reduction of pressure and/or heating.

As to the reaction ratio of the components, it is desirable to react the components [I]-(1) and [I]-(2) in such a manner that the magnesium content in the component [I]-(2) becomes 0.01 to 20 mmol, preferably 0.1 to 10 mmol, more preferably 0.2 to 4.0 mmol, per gram of the component [I]-(1). As to the components [I]-(1) and [I]-(3), it is preferable that the reaction be carried out using 0.01–10.0 mmol, preferably 0.1–5.0 mmol, more preferably 0.2–2.0 mmol, of component [I]-(3) per gram of component [I]-(1), although this ratio differs depending on whether the component [I]-(1) is subjected to a calcining treatment or not or conditions for the calcining treatment if applied.

As to the amount of the compound of the general formula $R^2OH$ to be used, it is desirable to use this compound in an amount of 0.1 to 50 g, preferably 1 to 30 g, per gram of component [I]-(2).

2. Component [II]

As examples of the organoaluminum compound of the general formula $Al(OR^3)_pR^4_qX_{3-(p+q)}$ used in the present invention wherein $R^3$ and $R^4$, which may be the same or different, are each a hydrocarbon residue preferably radical, having 1 to 24, preferably 1 to 12, carbon atoms, X is a halogen atom or hydrogen atom, and p and q are $0 \leq p < 3$ and $0 \leq q \leq 3$, provided $0 < p+q \leq 3$ are dimethylaluminum methoxide, dimethylaluminum ethoxide, dimethylaluminum isopropoxide, dimethylaluminum t-butoxide, dimethylaluminum n-butoxide, dimethylaluminum sec-butoxide, diethylaluminum methoxide, diethylaluminum ethoxide, diethylaluminum isopropoxide, diethylaluminum n-butoxide, diethylaluminum sec-butoxide, diethylaluminum cyclohexyloxide, diethylaluminum t-butoxide, dipropylaluminum ethoxide, dipropylaluminum t-butoxide, dibutylaluminum t-butoxide, di-i-butylaluminum methoxide, di-i-butylaluminum ethoxide, di-i-butylaluminum isopropoxide, di-i-butylaluminum i-butoxide, di-i-butylaluminum t-butoxide, di-t-butylaluminum ethoxide, di-t-butylaluminum t-butoxide, dimethylaluminum phenoxide, di-n-hexylaluminum ethoxide, di-n-hexylaluminum isopropoxide, ethylethoxyaluminum chloride, isobutylethoxyaluminum chloride, ethylphenoxyaluminum chloride, phenylethoxyaluminum chloride, ethylethoxyaluminum hydride, ethylmethoxyaluminum chloride, ethylisopropoxyaluminum chloride, ethylbutoxyaluminum chloride, phenylaluminum dichloride, diphenylaluminum chloride, benzylaluminum dichloride, dibenzylaluminum chloride, dimethylaluminum chloride, diethylaluminum fluoride, diethylaluminum chloride, diethylaluminum bromide, diethylaluminum iodide, di-isobutylaluminum chloride, methylaluminum sesquichloride, ethylaluminum sesquichloride, ethylaluminum sesquibromide, methylaluminum dichloride, ethylaluminum dichloride, isobutylaluminum dichloride, trimethylaluminum, triethylaluminum, tri-n-propylaluminum, tri-n-butylaluminum, tri-isobutylaluminum, tri-n-hexylaluminum, tri-n-octylaluminum and mixtures. Particularly, diethylaluminum chloride, ethylaluminum sesquichloride and ethylaluminum dichloride are preferred.

3. Component [III]

As the compound represented by the general formula $[R^5_aR^6_bR^7_cSi(OR^8)_dX_{4-(a+b+c+d)}]$ there may be used those wherein $R^5$, $R^6$, $R^7$ and $R^8$, which may be the same or different, are each a hydrocarbon radical having 1 to 20 carbon atoms, preferably 1–12 carbon atoms, such as hydrocarbon radical such as alkyl, aryl or aralkyl, X is hydrogen atom or a halogen atom such as chloro, bromo or iodo, and a, b, c and d are $0 \leq a < 4$, $0 \leq b < 4$, $0 \leq c < 4$ and $0 < d \leq 4$, provided $0 < a+b+c+d \leq 4$.

Examples of the silicon compound include various compounds represented by $Si(OR^8)_4$, $Si(OR^8)_3X$, $Si(OR^8)_2X_2$, $Si(OR^8)X_3$, $R^5Si(OR^8)_3$, $R^5Si(OR^8)_2X$, $R^5Si(OR^8)X_2$, $R^5R^6Si(OR^8)_2$, $R^5R^6Si(OR^8)X$, $R^5R^6R^7Si(OR^8)$ and the like. Concrete examples are $Si(OCH_3)_4$, $Si(OC_2H_5)_4$, $Si(Oi-C_3H_7)_4$, $Si(On-C_4H_9)_4$, $Si(OCH_3)_3Cl$, $Si(OC_2H_5)_3Cl$, $Si(Oi-C_3H_7)_3Cl$, $Si(On-C_4H_9)_3Cl$, $Si(Osec-C_4H_9)_3Cl$, $Si(OCH_3)_2Cl_2$, $Si(OC_2H_5)_2Cl_2$, $Si(Oi-C_3H_7)_2Cl_2$, $Si(On-C_4H_9)_2Cl_2$, $Si(OC_8H_{17})_2Cl_2$, $Si(OCH_3)Cl_3$, $Si(OC_2H_5)Cl_3$, $Si(Oi-C_3H_7)Cl_3$, $Si(On-C_4H_9)Cl_3$, $Si(OC_5H_{11})Cl_3$, $Si(OC_8H_{17})Cl_3$, $Si(OC_{18}H_{37})Cl_3$, $Si(OC_6H_5)Cl_3$, $Si(Op-CH_3C_6H_5)Cl_3$, $CH_3Si(OCH_3)_3$, $CH_3Si(OC_2H_5)_3$, $CH_3Si(Oi-C_3H_7)_3$, $C_2H_5Si(OCH_3)_3$, $C_2H_5Si(OC_2H_5)_3$, $C_2H_5Si(Oi-C_3H_7)_3$, $i-C_3H_7Si(OCH_3)_3$, $i-C_3H_7Si(OC_2H_5)_3$, $i-C_3H_7Si(Oi-C_3H_7)_3$, $n-C_3H_7Si(OCH_3)_3$, $n-C_3H_7Si(OC_2H_5)_3$, $n-C_3H_7Si(Oi-C_3H_7)_3$, $n-C_4H_9Si(OCH_3)_3$, $n-C_4H_9Si(OC_2H_5)_3$, $i-C_4H_9Si(OCH_3)_3$, $i-C_4H_9Si(OC_2H_5)_3$, $t-C_4H_9Si(OCH_3)_3$, $t-C_4H_9Si(OC_2H_5)_3$,

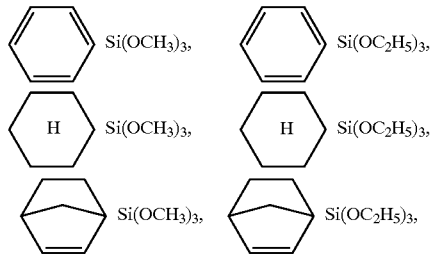

$CH_3Si(OCH_3)_2Cl$, $CH_3Si(OC_2H_5)_2Cl$, $CH_3Si(Oi-C_3H_7)_2Cl$, $CH_3Si(OCH_3)_2Br$, $CH_3Si(OC_2H_5)Br$, $CH_3Si(Oi-C_3H_7)_2Br$, $CH_3Si(OCH_3)_2I$, $CH_3Si(OC_2H_5)_2I$, $CH_3Si(Oi-C_3H_7)_2I$, $C_2H_5Si(OCH_3)_2Cl$, $C_2H_5Si(OC_2H_5)_2Cl$, $C_2H_5Si(Oi-C_3H_7)_2Cl$, $C_2H_5Si(OCH_3)_2Br$, $C_2H_5Si(OC_2H_5)_2Br$, $C_2H_5Si(Oi-C_3H_7)_2Br$, $C_2H_5Si(OCH_3)_2I$, $C_2H_5Si(OC_2H_5)_2I$, $C_2H_5Si(Oi-C_3H_7)_2I$, $i-C_3H_7Si(OCH_3)_2Cl$, $i-C_3H_7Si(OC_2H_5)_2Cl$, $i-C_3H_7Si(Oi-C_3H_7)_2Cl$, $n-C_3H_7Si(OCH_3)_2Cl$, $n-C_3H_7Si(OC_2H_5)_2Cl$, $n-C_3H_7Si(Oi-C_3H_7)_2Cl$, $n-C_4H_9Si(OCH_3)_2Cl$, $n-C_4H_9Si(OC_2H_5)_2Cl$, $n-C_4H_9Si(Oi-C_3H_7)_2Cl$, $i-C_4H_9Si(OCH_3)_2Cl$, $i-C_4H_9Si(OC_2H_5)_2Cl$, $i-C_4H_9Si(Oi-C_3H_7)_2Cl$, $t-C_4H_9Si(OCH_3)_2Cl$, $t-C_4H_9Si(OC_2H_5)_2Cl$, $t-C_4H_9Si(Oi-C_3H_7)_2Cl$,

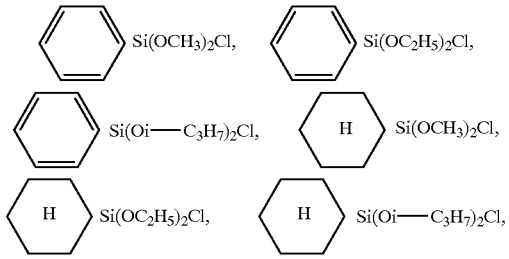

$CH_3Si(OCH_3)Cl_2$, $CH_3Si(OC_2H_5)Cl_2$, $CH_3Si(Oi-C_3H_7)Cl_2$, $C_2H_5Si(OCH_3)Cl_2$, $C_2H_5Si(C_2H_5)Cl_2$, $C_2H_5Si(Oi-C_3H_7)Cl_2$, $i-C_3H_7Si(OCH_3)Cl_2$, $i-C_3H_7Si(OC_2H_5)Cl_2$, $n-C_3H_7Si(OCH_3)Cl_2$, $n-C_3H_7Si(OC_2H_5)Cl_2$, $n-C_4H_9Si(OCH_3)Cl_2$, $n-C_4H_9Si(OC_2H_5)Cl_2$, $i-C_4H_9Si(OCH_3)Cl_2$, $i-C_4H_9Si(OC_2H_5)Cl_2$, $t-C_4H_9Si(OCH_3)Cl_2$, $t-C_4H_9Si(OC_2H_5)Cl_2$,

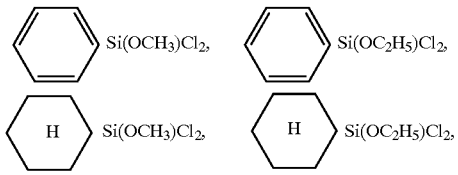

$(CH_3)_2Si(OCH_3)_2$, $(CH_3)_2Si(OC_2H_5)_2$, $(C_2H_5)_2Si(OCH_3)_2$, $(C_2H_5)_2Si(OC_2H_5)_2$, $(i-C_3H_7)_2Si(OCH_3)_2$, $(i-C_3H_7)_2Si(OC_2H_5)_2$, $(n-C_3H_7)_2Si(OCH_3)_2$, $(n-C_3H_7)_2Si(OC_2H_5)_2$, $(n-C_4H_7)_2Si(OCH_3)_2$, $(n-C_4H_9)_2Si(OC_2H_5)_2$, $(i-C_4H_9)_2Si(OCH_3)_2$, $(i-C_4H_9)_2Si(OC_2H_5)_2$, $(t-C_4H_9)_2Si(OCH_3)_2$, $(t-C_4H_9)_2Si(OC_2H_5)_2$,

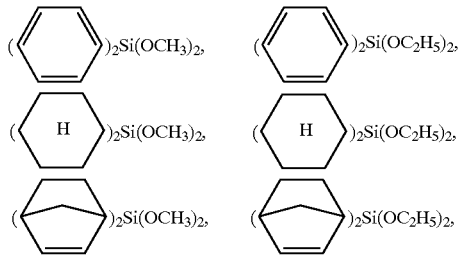

$(CH_3)(C_2H_5)Si(OCH_3)_2$, $(CH_3)(C_2H_5)Si(OC_2H_5)_2$, $(CH_3)(i-C_3H_7)Si(OCH_3)_2$, $(CH_3)(i-C_3H_7)Si(OC_2H_5)_2$, $(CH_3)(t-C_4H_9)Si(OCH_3)_2$, $(CH_3)(t-C_4H_9)Si(OC_2H_5)_2$,

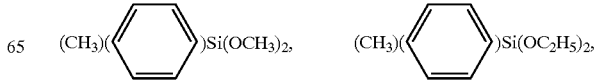

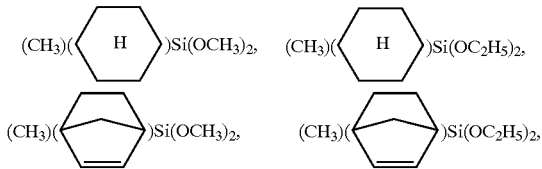

$(C_2H_5)(i-C_3H_7)Si(OCH_3)_2$, $(C_2H_5)(i-C_3H_7)Si(OC_2H_5)_2$, $(C_2H_5)(t-C_4H_9)Si(OCH_3)_2$, $(C_2H_5)(t-C_4H_9)Si(OC_2H_5)_2$,

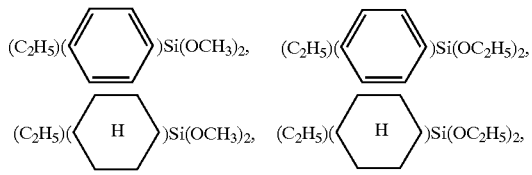

$(CH_3)_2Si(Oi-C_3H_7)_2$, $(C_2H_5)_2Si(Oi-C_3H_7)_2$, $(i-C_3H_7)_2Si(Oi-C_3H_7)_2$, $(t-C_4H_9)_2Si(Oi-C_3H_7)_2$,

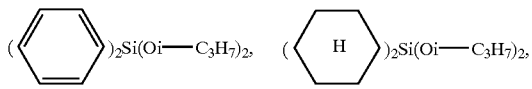

$(CH_3)_2Si(OCH_3)Cl$, $(CH_3)_2Si(OC_2H_5)Cl$, $(C_2H_5)_2Si(OCH_3)Cl$, $(C_2H_5)_2Si(OC_2H_5)Cl$, $(i-C_3H_7)_2Si(OCH_3)Cl$, $(i-C_3H_7)_2Si(OC_2H_5)Cl$, $(t-C_4H_9)_2Si(OCH_3)Cl$, $(t-C_4H_9)_2Si(OC_2H_5)Cl$,

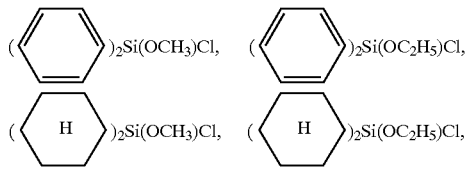

$(CH_3)(t-C_4H_9)Si(OCH_3)Cl$, $(CH_3)(t-C_4H_9)Si(OC_2H_5)Cl$,

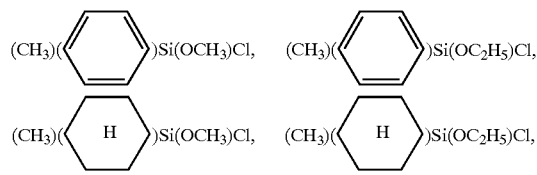

$(CH_3)_2Si(Oi-C_3H_7)Cl$, $(C_2H_5)_2Si(Oi-C_3H_7)Cl$,

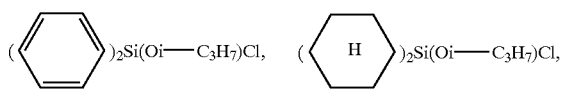

$(CH_3)(t-C_4H_9)Si(Oi-C_3H_7)Cl$,

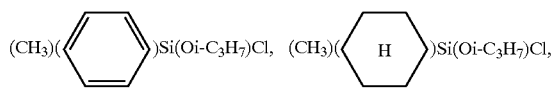

$(CH_3)_3Si(OCH_3)$, $(CH_3)_3Si(OC_2H_5)$, $(C_2H_5)_3Si(OCH_3)$, $(C_2H_5)_3Si(OC_2H_5)$, $(CH_3)_2(t-C_4H_9)Si(OCH_3)$, $(CH_3)_2(t-C_4H_9)Si(OC_2H_5)$,

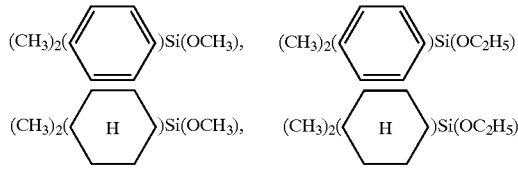

and the like. Among them, $Si(OCH_3)_4$, $Si(OC_2H_5)_4$, $Si(OCH_3)_3Cl$, $Si(OC_2H_5)_3Cl$, $Si(OCH_3)_2Cl_2$, $Si(OC_2H_5)_2Cl_2$, $(CH_2)Si(OCH_3)_2Cl$, $(C_2H_5)Si(OC_2H_5)_2Cl$, $(CH_3)_2Si(OCH_3)_2$, $(C_2H_5)_2Si(OC_5H_5)_2$,

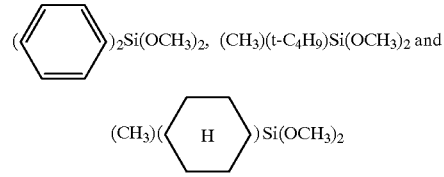

are most preferred.

4. Preparation of Solid Catalyst Component

The solid catalyst component used in the present invention is obtained by reacting the components [I] to [III] in any of the following orders:

(A) The components [I] and [II] are reacted at first, and then the component [III] is reacted with the above product.

(B) The components [I] and [III] are reacted at first, and then the component [II] is reacted with the above product.

(C) The components [II] and [III] are reacted at first, and then the component [I] is reacted with the above product.

(D) The components [I] to [III] are reacted at a time.

Reaction methods are not specially limited. For example, according to a preferred method, components to be reacted are contacted at a temperature of 0° to 300+ C., preferably 20° to 150° C., for 5 minutes to 10 hours, in the presence or absence of an inert hydrocarbon solvent inert to conventional Ziegler catalysts, such as, for example, pentane, hexane, cyclohexane, heptane, octane, nonane, decane, benzene, toluene, or xylene. When the reaction is conducted in an inert hydrocarbon solvent, the solvent is preferably removed followed by the second stage reaction which may be conducted in the absence of any solvent or in the presence of a newly added solvent. Also, it is possible that the inert solvent is not removed after the first stage reaction, followed by the second stage reaction in the remaining solvent. Also, it is possible that the first stage reaction is conducted in the absence by evaporation or the like after the reaction. Of course, when the components [I], [II] and [III] are reacted stepwise in the manner as the above (A), (B) and (C), the first and/or second stage reaction may be conducted in the presence or absence of an inert hydrocarbon solvent. For example, the first stage reaction is conducted in an inert hydrocarbon solvent, and then the solvent is removed, of an inert solvent, followed by the second stage reaction in the absence of any solvent or in the presence of a newly added solvent.

As to the reaction ratio of the components [I], [II] and [III], the component [II] is preferably used in such a manner that the component [II]/{the component [I]-(3) in the component [I]} (molar ratio) is 0.01 to 100, more preferably 0.2 to 10, most preferably 0.5 to 5.0. The component [III] is preferably used in such a manner that the component [III]/{the component [I]-(3) in the component [I]} (molar ratio) is 0.01 to 10, more preferably 0.03 to 5.0, most preferably 0.05 to 1.0.

Of course, the reactions for the preparation of each component and the solid catalyst component should be performed in an inert gas atmosphere, and moisture should be avoided.

<2> Organometallic Compound

The catalyst used in the present invention comprises the above mentioned solid catalyst component and an organometallic compound.

As the organometallic compound used in the present invention, there may be preferably employed an organometallic compound of a metal of Groups I–IV in the Periodic Table which is known as a component of Ziegler type catalyst. Particularly preferred are organoaluminum compounds and organozinc compounds. To illustrate these compounds, mention may be made of organoaluminum compounds of the general formulae $R_3Al$, $R_2AlX$, $RAlX_2$, $R_2AlOR$, $RAl(OR)X$ and $R_3Al_2X_3$ wherein R, which may be the same or different, is an alkyl or aryl group having 1 to 20 carbon atoms and X is a halogen atom, as well as organozinc compounds of the general formula $R_2Zn$ wherein R, which may be the same or different, is an alkyl group having 1 to 20 carbon atoms. Concrete examples are trimethylaluminum, triethylaluminum, triisopropylaluminum, triisobutylaluminum, tri-sec-butylaluminum, tri-tert-butylaluminum, trihexylaluminum, trioctylaluminum, diethylaluminum chloride, diisopropylaluminum chloride, diethylaluminum ethoxide, ethylaluminum sesquichloride, diethylzinc, and mixtures thereof.

The amount of the organometallic compound used is not specially limited. But usually it is in the range of 0.1 to 1,000 moles per mole of the titanium compound.

It is also preferable in the present invention that the organometallic compound component be used as a mixture or addition compound of the organometallic compound and an organic acid ester.

Where the organometallic compound component is used as a mixture of the organometallic compound and an organic acid ester, the organic acid ester is used usually in an amount of 0.1 to 1 mole, preferably 0.2 to 0.5 mole, per mole of the organometallic compound. Where it is used as an addition compound of the organometallic compound and the organic acid ester, the molar ratio is preferably in the range of 2:1 to 1:2.

The organic acid ester is the ester of a saturated or unsaturated, mono- or dibasic organic carboxylic acid having 1 to 24 carbon atoms and an alcohol having 1 to 30 carbon atoms. Examples are methyl formate, ethyl acetate, amyl acetate, phenyl acetate, octyl acetate, methyl methacrylate, ethyl stearate, methyl benzoate, ethyl benzoate, n-propyl benzoate, iso-propyl benzoate, butyl benzoate, hexyl benzoate, cyclopentyl benzoate, cyclohexyl benzoate, phenyl benzoate, benzoic acid-4-tolyl, methyl salicylate, ethyl salicylate, methyl p-hydroxybenzoate, ethyl p-hydroxybenzoate, phenyl salicylate, cyclohexyl p-hydroxybenzoate, benzyl salicylate, ethyl α-resorcinol carboxylate methyl anisate, methyl p-ethoxybenzoate, methyl p-toluylate, ethyl p-toluylate, phenyl p-toluylate, ethyl o-toluylate, ethyl m-toluylate, methyl p-aminobenzoate, ethyl p-aminobenzoate, vinyl benzoate, allyl benzoate, benzyl benzoate, methyl naphthoate, and ethyl naphthoate.

Particularly preferred are alkyl esters, especially methyl esters, of benzoic acid, o- or p-toluic acid and anisic acid.

<3> Polymerization of Olefin

The olefin polymerization using the catalyst of the present invention can be performed in the form of slurry polymerization, solution polymerization or vapor phase polymerization. The catalyst used in the present invention is particularly suitable for vapor phase polymerization. The polymerization reaction is carried out in the same way as in the conventional olefin polymerization reaction using a Ziegler type catalyst. More particularly, the reaction is performed in a substantially oxygen- and water-free condition in the presence or absence of an inert hydrocarbon. Olefin polymerizing conditions involve temperatures in the range of 20° to 120° C., preferably 50° to 100° C., and pressures in the range of atmospheric pressure to 70 kg/cm$^2$, preferably 2 to 60 kg/cm$^2$. Adjustment of the molecular weight can be done to some extent by changing polymerization conditions such as the polymerization temperature and the catalyst mole ratio, but the addition of hydrogen into the polymerization system is more effective for this purpose. Of course, using the catalyst of the present invention, there can be performed two or more multi-stage polymerization reactions involving different polymerization conditions such as different hydrogen concentrations and different polymerization temperatures.

The process of the present invention is applicable to the polymerization of all olefins that can be polymerized using a Ziegler type catalyst, preferably α-olefins having 2 to 12 carbon atoms. For example, it is suitable for the homopolymerization of such α-olefins as ethylene, propylene, 1-butene, 1-hexene and 4-methyl-1-pentene and the copolymerization of ethylene and an α-olefin having 3–12 carbon atoms such as propylene, 1-butene, 1-hexene and 4-methylpentene-1, the copolymerization of propylene and 1-butene and the copolymerization of ethylene and one or more α-olefins.

Copolymerization with dienes is also preferable for the modification of polyolefins. Examples of diene compounds which may be used for this purpose are butadiene, 1,4-hexadiene, ethylidene norbornene and dicyclopentadiene. The comonomer content in the copolymerization may be selected optionally. For instance, when ethylene and a α-olefin having 3–12 carbon atoms is copolymerized, the α-olefin content in the copolymer is preferably 0–40 molar %, more preferably 0–30 molar %.

<Effects of the Invention>

Homopolymers or copolymers of olefins prepared by using as catalyst the solid catalyst component and the organometallic compound in the present invention are remarkably high in bulk density, relatively large in average particle diameter and narrow in particle size distribution and have a reduced proportion of fine particles, so there is little adhesion of polymer to the reactor walls during polymerization thus permitting stable operations. Besides, not only dusting can be prevented in a forming operation and so the efficiency of the forming operation can be enhanced, but also it is possible to omit a pelletizing step.

Further, since the homopolymers or copolymers in question according to the present invention are narrow in molecular weight distribution, they can be formed into films having high strength and superior in transparency and also superior in anti-blocking property and heat-sealability.

EXAMPLES

The following examples are given to further illustrate the present invention and for practising the invention, but it is to be understood that the invention is not limited thereto.

[How to Measure Physical Properties of Polymer]

Melting Point

Using a differential scanning calorimeter (DSC) (a product of Seiko Denshi K.K.), a polymer sample weighing 5 mg is once melted at 180° C. and then cooled to −40° C., thereafter the temperature is raised at a rate of 10° C./min and the temperature corresponding to an endothermic peak top is regarded as the melting point of the polymer.

Hexane Extraction

A copolymer powder is roll-milled at 180° C. and then pressed into a 5 cm×5 cm×0.2 mm sheet, thereafter the sheet is extracted in boiling hexane for 5 hours and the percent reduction in weight is regarded as hexane extraction.

Example 1

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 100 g of dehydrated 2-methyl-l-pentanol, 5.0 g of the reaction product of anhydrous magnesium chloride and triethoxyaluminum prepared above and 10.0 g of tetra-n-ethoxytitanium, and reaction was allowed to take place at 80° C. for 1 hour. After cooling to room temperature, 46 g of silica (Fuji-Davison #955) which had been calcined at 400° C. for 3 hours was placed in the flask and again reaction was allowed to take place at 80° C. for 2 hours, followed by drying under reduced pressure at 120° C. for 2 hours to obtain a solid powder. Then, 100 cc of dehydrated hexane and 10.0 g of diethylaluminum chloride were added thereto and reaction was allowed to take place at room temperature for 1 hour. Thereafter, the hexane was removed by blowing nitrogen at 60° C. for 3 hours to obtain powder. Thereafter 0.5 g of tetraethoxysilane was added thereto and reaction was allowed to take place at room temperature for 1 hour to obtain a solid catalyst component.

(b) Vapor Phase Polymerization

A stainless steel autoclave equipped with a stirrer was used as a vapor phase polymerization apparatus, and a loop was formed using a blower, a flow control device and a dry type cyclone. The temperature of the autoclave was adjusted by passing warm water through a jacket.

The solid catalyst component prepared above and triethylaluminum were fed at rates of 250 mg/hr and 50 mmol/hr, respectively, into the autoclave held at 80° C. Also, butene-1, ethylene and hydrogen gases were fed while adjusting the butene-1/ethylene mole ratio in the internal vapor phase of the autoclave to 0.25 and also adjusting the hydrogen gas pressure to 15% of the total pressure. Polymerization was performed continuously for 10 hours while maintaining the total pressure at 8 kg/cm$^2$G, circulating the gases in the polymerization system using the blower and withdrawing the resulting polymer intermittently.

The ethylene copolymer thus prepared was a round particulate matter having a melt flow rate (MFR, ASTM-D1238-65T: 190° C., load 2.16 kg) of 0.95 g/10 min, a density of 0.9201 g/cm$^3$, a bulk density of 0.47 g/cm$^3$ and an average particle diameter of 730 $\mu$m. Catalytic activity was 200,000 g·copolymer/g·Ti and thus extremely high. When the interior of the autoclave was checked after a continuous polymerization for 10 hours, there was found no polymer deposited on the inner wall and the stirrer.

FR value (MFR$_{10}$/MFR$_{2.16}$) of this copolymer represented by the ratio of a melt flow rate (MFR$_{10}$) as measured under a load of 10 kg to a melt flow rate (MFR$_{2.16}$) as measured under a load of 2.16 kg, both at 190° C. according to the method defined by ASTM-D1238-65T, was 7.2 and thus the molecular weight distribution was extremely narrow.

The melting point of this copolymer was 121.6° C. and the hexane extraction thereof was 2.1 wt %.

Example 2

A solid catalyst component was prepared in the same way as in Example 1 except that 0.4 g of diethyldiethoxysilane was used in place of tetraethoxysilane. Using this solid catalyst component, polymerization was performed in the same manner as in Example 1.

As a result, catalytic activity was as high as 210,000 g·copolymer/g·Ti and there was obtained a round particulate matter having an MFR of 0.85 g/10 min, a density of 0.9204 g/cm$^3$, a bulk density of 0.44 g/cm$^3$ and an average particle diameter of 800 $\mu$m. FR value was 7.5 and thus the molecular weight distribution was narrow. Further, the melting point of the copolymer was 121.9° C. and the hexane extraction thereof was 2.2 wt %.

Example 3

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 140 cc of dehydrated, denatured ethanol (containing 5 kg of methanol per 200 l of ethanol), 20 g of dehydrated 2-methyl-1-pentanol and 8.0 g of tetraethoxytitanium. After stirring at room temperature for 1 hour, 10.0 g of the reaction product of anhydrous magnesium chloride and triethoxyaluminum prepared above was put into the flask and reaction was allowed to take place at 80° C. for 1 hour. After cooling to room temperature, 46 g of silica (Fuji-Davison #955) which had been calcined at 400° C. for 3 hours was placed in the flask and again reaction was allowed to take place at 80° C. for 2 hours, followed by drying under reduced pressure at 120° C. for 2 hours to obtain a solid powder. Then, 100 cc of dehydrated hexane and 10.0 g of diethylaluminum chloride were added thereto and reaction was allowed to take place at room temperature for 1 hour. Thereafter, the hexane was removed by blowing nitrogen at 60° C. for 3 hours to obtain powder. 0.3 g of dimethyl-dimethoxysilane was added thereto and reaction was allowed to take place at room temperature for 3 hours to obtain a solid catalyst component.

(b) Vapor Phase Polymerization

Using the solid catalyst component prepared above, polymerization was conducted in the same way as in Example 1. As a result, catalytic activity was as high as 220,000 g·copolymer/g·Ti and there was obtained a round particulate matter having an MFR of 1.01 g/10 min, a density of 0.9198 g/cm$^3$, a bulk density of 0.45 g/cm$^3$ and an average particle diameter of 810 $\mu$m. FR value was 7.4 and thus the molecular weight distribution was narrow. Further, the melting point of the copolymer was 121.5° C. and the hexane extraction thereof was 2.4 wt %.

Example 4

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 100 g of dehydrated 2-methyl-l-pentanol, 5.0 g of the reaction product of anhydrous magnesium chloride and triethoxyaluminum prepared above and 8.3 g of titanium tetrachloride was added dropwise for 30 minutes while stirring at room temperature and thereafter reaction was allowed to take place at 80° C. for 1 hour. After cooling to room temperature, 46 g of silica (Fuji-Davison #955) which had been calcined at 400° C. for 3 hours was placed in the flask and again reaction was allowed to take place at 80° C. for 2 hours, followed by drying under reduced pressure at 120° C. for 2 hours to obtain a solid powder. Then, 100 cc of dehydrated hexane and 10.0 g of diethylaluminum chloride were added thereto and reaction was allowed to take place at room temperature for 1 hour. Thereafter, the hexane was removed by blowing nitrogen at 60° C. for 3 hours to obtain powder. Thereafter, 0.5 g of tetraethoxysilane was added thereto and reaction was allowed to take place at room temperature for 3 hours to obtain a solid catalyst component.

(b) Vapor Phase Polymerization

Using the solid catalyst component prepared above, polymerization was conducted in the same way as in Example 1. As a result, catalytic activity was as high as 180,000 g·copolymer/g·Ti and there was obtained a round particulate matter having an MFR of 0.93 g/10 min, a density of 0.9209 g/cm$^3$, a bulk density of 0.46 g/cm$^3$ and an average particle diameter of 700 μm. FR value was 7.4 and thus the molecular weight distribution was narrow. Further, the melting point of the copolymer was 121.2° C. and the hexane extraction thereof was 2.4 wt %.

Example 5

A solid catalyst component was prepared in the same way as in Example 4 except that 8.7 g of trichloromonoethoxytitanium was used in place of titanium tetrachloride. Using this solid catalyst component, polymerization was conducted in the same manner as in Example 1.

As a result, catalytic activity was as high as 190,000 g·copolymer/g·Ti and there was obtained a round particulate matter having an MFR of 1.05 g/10 min, a density of 0.9211 g/cm$^3$, a bulk density of 0.46 g/cm$^3$ and an average particle diameter of 710 μm. FR value was 7.3 and thus the molecular weight distribution was narrow. Further, the melting point of the copolymer was 121.3° C. and the hexane extraction thereof was 2.3 wt %.

Example 6
(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 140 cc of dehydrated ethanol, 17.0 g of dehydrated 2-ethyl-1-hexanol and 7.8 g of tetrabutoxytitanium. After stirring for 1 hour at room temperature, 7.5 g of the reaction product of anhydrous magnesium chloride and triethoxyaluminum prepared above was put into the flask and reaction was allowed to take place at 80° C. for 1 hour. Then, after cooling to room temperature, 46 g of silica (Fuji-Davison #955) which had been calcined at 400° C. for 3 hours was charged into the flask and again reaction was allowed to take place at 80° C. for 2 hours, followed by drying under reduced pressure at 120° C. for 2 hours to obtain a solid powder. Then, 100 cc of dehydrated hexane and 10.0 g of diethylaluminum chloride were added thereto and reaction was allowed to proceed at room temperature for 1 hour. Thereafter, the hexane was removed by blowing nitrogen at 60° C. for 3 hours to obtain powder. Thereafter, 0.5 g of tetraethoxysilane was added thereto and reaction was allowed to take place at room temperature for 3 hours to obtain a solid catalyst component.

Using the solid catalyst component prepared above, polymerization was conducted in the same way as in Example 1. As a result, catalytic activity was as high as 220,000 g·copolymer/g·Ti and there was obtained a round particulate matter having an MFR of 0.92 g/10 min, a density of 0.9200 g/cm$^3$, a bulk density of 0.47 g/cm$^3$ and an average particle diameter of 780 μm. FR value was 7.2 and thus the molecular weight distribution was narrow. Further, the melting point of the copolymer was 120.8° C. and the hexane extraction thereof was 2.0 wt %.

Example 7

A solid catalyst component was prepared in the same way as in Example 6 except that 0.5 g of methyl-cyclohexyldimethoxysilane was used in place of tetraethoxysilane. Using this solid catalyst component, polymerization was performed in the same manner as in Example 1.

As a result, catalytic activity was as high as 240,000 g·copolymer/g·Ti and there was obtained a round particulate matter having an MFR of 0.88 g/10 min, a density of 0.9210 g/cm$^3$, a bulk density of 0.46 g/cm$^3$ and an average particle diameter of 820 μm. FR value was 7.3 and thus the molecular weight distribution was narrow. Further, the melting point of the copolymer was 121.8° C. and the hexane extraction thereof was 2.5 wt %.

Example 8
(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere.

A three-necked flask equipped with a stirrer and a reflux condenser was purged with nitrogen and then charged with 140 cc of dehydrated ethanol, 17.0 g of dehydrated 2-ethyl-1-hexanol and 7.8 g of tetrabutoxytitanium. After stirring at room temperature for 1 hour, 7.5 g of the reaction product of anhydrous magnesium chloride and triethoxyaluminum prepared above was put into the flask and reaction was allowed to take place at 80° C. for 1 hour. Then, after cooling to room temperature, 46 g of silica (Fuji-Davison #955) which had been calcined at 400° C. for 3 hours was charged into the flask and again reaction was allowed to proceed at 80° C. for 2 hours, followed by drying under reduced pressure at 120° C. for 2 hours to obtain a solid powder. Then, 100 cc of dehydrated hexane and 10.0 g of diethylaluminum chloride were added thereto and reaction was allowed to take place at room temperature for 1 hour. Thereafter, 0.5 g of tetraethoxysilane was added and reaction was allowed to take place at 60° C. for 3 hours, and then the hexane was removed by blowing nitrogen at 60° C. for 3 hours to obtain a solid catalyst component.

Using the solid catalyst component prepared above, polymerization was conducted in the same way as in Example 1. As a result, catalytic activity was as high as 230,000 g·copolymer/g·Ti and there was obtained a round particulate matter having an MFR of 0.89 g/10 min, a density of 0.9198 g/cm³, a bulk density of 0.47 g/cm³ and an average particle diameter of 780 μm. FR value was 7.2 and thus the molecular weight distribution was narrow. Further, the melting point of the copolymer was 121.1° C. and the hexane extraction thereof was 2.0 wt %.

Example 9

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 140 cc of dehydrated, denatured ethanol (containing 5 kg of methanol per 200 l of ethanol), 17.0 g of dehydrated 2-methyl-1-pentanol and 15.0 g of tetra-n-butoxytitanium. After stirring at room temperature for 1 hour, 7.5 g of the reaction product of anhydrous magnesium chloride and triethoxyaluminum prepared above was put into the flask and reaction was allowed to take place at 80° C. for 1 hour. After cooling to room temperature, 46 g of silica (Fuji-Davison #955) which had been calcined at 400° C. for 3 hours was placed in the flask and again reaction was allowed to take place at 80° C. for 2 hours, followed by drying under reduced pressure at 120° C. for 2 hours to obtain a solid powder. Then, 100 cc of dehydrated hexane and 0.7 g of tetraethoxysilane were added thereto and reaction was allowed to take place at room temperature for 3 hours. Thereafter, 10.0 g of diethylaluminum chloride was added thereto and reaction was allowed to take place at room temperature for 1 hour and then the hexane was removed by blowing nitrogen at 60° C. for 3 hours to obtain a solid catalyst component.

(b) Vapor Phase Polymerization

Using the solid catalyst component prepared above, polymerization was conducted in the same way as in Example 1. As a result, catalytic activity was as high as 220,000 g·copolymer/g·Ti and there was obtained a round particulate matter having an MFR of 0.91 g/10 min, a density of 0.9203 g/cm³, a bulk density of 0.45 g/cm³ and an average particle diameter of 760 μm. FR value was 7.2 and thus the molecular weight distribution was narrow. Further, the melting point of the copolymer was 121.1° C. and the hexane extraction thereof was 2.2 wt %.

Example 10

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere.

A three-necked flask equipped with a stirrer and a reflux condenser was purged with nitrogen and then charged with 140 cc of dehydrated modified ethanol (containing 5 kg of methanol per 200 l of ethanol) and 17.0 g of dehydrated 2-ethyl-1-hexanol and 15.0 g of tetra-n-butoxytitanium. After stirring at room temperature for 1 hour, 7.5 g of the reaction product of anhydrous magnesium chloride and triethoxyaluminum prepared above was put into the flask and reaction was allowed to take place at 80° C. for 1 hour. Then, after cooling to room temperature, 46 g of silica (Fuji-Davison #955) which had been calcined at 400° C. for 3 hours was charged into the flask and again reaction was allowed to proceed at 80° C.; for 2 hours, followed by drying under reduced pressure at 120° C. for 2 hours to obtain a solid powder.

A three-necked flask equipped with a stirrer and a reflux condenser was purged with nitrogen and then 100 cc of dehydrated hexane, 10.0 g of diethylaluminum chloride and 0.7 g of tetraethoxysilane were added thereto and reaction was allowed to take place at room temperature for 1 hour. The product thus obtained was added to the above solid powder. Thereafter, the hexane was removed by blowing nitrogen at 60° C. for 3 hours to obtain a solid catalyst component.

(b) Vapor Phase Polymerization

Using the solid catalyst component prepared above, polymerization was conducted in the same way as in Example 1. As a result, catalytic activity was as high as 190,000 g·copolymer/g·Ti and there was obtained a round particulate matter having an MFR of 0.76 g/10 min, a density of 0.9214 g/cm³, a bulk density of 0.45 g/cm³ and an average particle diameter of 690 μm. FR value was 7.1 and thus the molecular weight distribution was narrow. Further, the melting point of the copolymer was 121.7° C. and the hexane extraction thereof was 1.9 wt %.

Example 11

A solid catalyst component was prepared in the same way as in Example 1 except that 10 g of ethylethoxyaluminum chloride was used in place of diethylaluminum chloride. Using this solid catalyst component, polymerization was carried out in the same manner as in Example 1.

As a result, catalytic activity was as high as 180,000 g·copolymer/g·Ti and there was obtained a round particulate matter having an MFR of 0.71 g/10 min, a density of 0.9223 g/cm³, a bulk density of 0.44 g/cm³ and an average particle diameter of 650 μm. FR value was 7.3 and thus the molecular weight distribution was narrow. Further, the melting point of the copolymer was 122.0° C. and the hexane extraction thereof was 2.1 wt %.

Example 12

A solid catalyst component was prepared in the same way as in Example 1 except that 3.6 g of triethoxyborone was used in place of tetraethoxyaluminum. Using this solid catalyst component, polymerization was carried out in the same manner as in Example 1.

As a result, catalytic activity was as high as 220,000 g·copolymer/g·Ti and there was obtained a round particulate matter having an MFR of 1.06 g/10 min, a density of 0.9199 g/cm³, a bulk density of 0.45 g/cm³ and an average particle diameter of 770 μm. FR value was 7.4 and thus the molecular weight distribution was narrow. Further, the melting point of the copolymer was 121.2° C. and the hexane extraction thereof was 2.6 wt %.

Example 13

A solid catalyst component was prepared in the same way as in Example 1 except that 2.9 g of diethoxymagnesium was used in place of triethoxyaluminum. Using this solid catalyst component, polymerization was performed in the same manner as in Example 1. As a result, catalytic activity was as high as 230,000 g·copolymer/g·Ti and there was obtained a round particulate matter having an MFR of 0.88 g/10 min, a density of 0.9206 g/cm³, a bulk density of 0.43 g/cm³ and an average particle diameter of 770 μm. FR value was 7.4 and thus the molecular weight distribution was narrow. Further, the melting point of the copolymer was 121.6° C. and the hexane extraction thereof was 2.4 wt %.

Example 14

A solid catalyst component was prepared in the same way as in Example 1 except that silica-alumina was used in place of silica. Using this solid catalyst component, polymerization was performed in the same manner as in Example 1. As a result, catalytic activity was as high as 160,000 g·copolymer/g·Ti and there was obtained a round particulate matter having an MFR of 1.00 g/10 min, a density of 0.9231 g/cm$^3$, a bulk density of 0.46 g/cm$^3$ and an average particle diameter of 520 μm. FR value was 7.1 and thus the molecular weight distribution was narrow. Further, the melting point of the copolymer was 122.4° C. and the hexane extraction thereof was 2.3 wt %.

Example 15

A solid catalyst component was prepared in the same way as in Example 1 except that alumina was used in place of silica. Using this solid catalyst component, polymerization was performed in the same manner as in Example 1. As a result, catalytic activity was as high as 180,000 g·copolymer/g·Ti and there was obtained a round particulate matter having an MFR of 0.96 g/10 min, a density of 0.9224 g/cm$^3$, a bulk density of 0.44 g/cm$^3$ and an average particle diameter of 750 μm. FR value was 7.3 and thus the molecular weight distribution was narrow. Further, the melting point of the copolymer was 121.8° C. and the hexane extraction thereof was 2.4 wt %.

Comparative Example 1

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 100 g of dehydrated 2-methyl-1-pentanol, 5.0 g of the reaction product of anhydrous magnesium chloride and triethoxyaluminum prepared above and 10.0 g of tetra-n-ethoxytitanium, and reaction was allowed to take place at 80° C. for 1 hour. After cooling to room temperature, 46 g of silica (Fuji-Davison #955) which had been calcined at 400° C. for 3 hours was placed in the flask and again reaction was allowed to take place at 80° C. for 2 hours, followed by drying under reduced pressure at 120° C. for 2 hours to obtain a solid powder. Then, 100 cc of dehydrated hexane and 10.0 g of diethylaluminum chloride were added thereto and reaction was allowed to take place at room temperature for 1 hour. Thereafter, the hexane was removed by blowing nitrogen at 60° C. for 3 hours to obtain a solid catalyst component.

(b) Vapor Phase Polymerization

Using the solid catalyst component prepared above, polymerization was conducted in the same way as in Example 1. As a result, catalytic activity was as high as 240,000 g·copolymer/g·Ti and there was obtained a particulate matter having an MFR of 1.02 g/10 min, a density of 0.9205 g/cm, a bulk density of 0.45 g/cm$^3$ and an average particle diameter of 830 μm. FR value was 7.4. The melting point of the copolymer was 121.6° C. and the hexane extraction thereof was 2.7 wt %. The polymer obtained by using the solid catalyst component without the added silicate had a higher FR value and hexane extract.

What is claimed is:

1. A process for preparing a polyolefin by polymerizing or copolymerizing an olefin or olefins in the presence of a catalyst comprising a solid catalyst component and an organometallic compound, the solid catalyst compound being prepared by reacting the following components [I], [II] and [III]:

I a reaction product obtained by the following components (1), (2) and (3) in the presence of a compound represented by the general formula R$^2$OH wherein R$^2$ is a hydrocarbon radical having 1 to 20 carbon atoms or an organic radical containing an element selected from the group consisting of oxygen, nitrogen, sulfur, and chlorine:

(1) a silicon oxide and/or aluminum oxide;

(2) a reaction product obtained by reacting a magnesium halide and a compound represented by the general formula Me(OR)$_n$X$_{z-n}$ wherein Me represents an element of Groups Ia to IVa in the Periodic Table, z represents the valence of the element Me, n is 0<n≦z, X is a halogen atom, and R is a hydrocarbon radical having 1 to 20 carbon atoms; and (3) a titanium compound represented by the general formula Ti(OR$^1$)$_m$X$_{4-m}$ wherein R$^1$ is a hydrocarbon radical having 1 to 20 carbon atoms, X is a halogen atom, and m is 0≧m≧4;

II an organoaluminum compound represented by general formula Al(OR$^3$)$_p$R$_q^4$X$_{3-(p+q)}$ wherein R$^3$ and R$^4$, which may be the same or different, are each a hydrocarbon radical having 1 to 24 carbon atoms, X is a halogen atom or hydrogen atom, and p and q are 0≧p<3, and 0≧q ≧3, provided 0<p+q≧3; and III a silicon compound represented by the general formula R$^5_a$R$^6_b$R$^7_c$Si(OR$^8$)$_d$X$_{4-(a+b+c+d)}$ wherein R$^5$, R$^6$, R$^7$ and R$^8$, which may be the same or different, are each a hydrocarbon radical having 1 to 20 carbon atoms, X is hydrogen or a halogen atom and a, b, c and d are 0≧a<4, 0≧b≧4, 0≧c<4 and 0<d≧4.

2. A process of claim 1 wherein the reaction of the components I, II and III comprises a step wherein the components I and II are reacted and a step wherein the product obtained in the above step and the component III are reacted.

3. A process of claim 1 wherein the reaction of the components I, II and III comprises a step wherein the components I and III are reacted and a step wherein the product obtained in the above step and the component II are reacted.

4. A process of claim 1 wherein the reaction of the components I, II and III comprises a step wherein the components II and III are reacted and a step wherein the product obtained in the above step and the component I are reacted.

5. A process of claim 1 wherein the reaction of the components I, II and III comprises a step wherein the components I, II and III are reacted simultaneously.

6. A process of claim 1 wherein the reaction of the compound of the general formula Me(OR)$_n$X$_{z-n}$ to the magnesium halide is in the range of 0.01 to 10 in terms of Me/Mg (molar ratio).

7. A process of claim 1 wherein the reaction ratio of the component I -(1) and the component I -(2) is 0.01 to 20.0 mmol of the magnesium halide in the component I -(2) per gram of the component I -(1).

8. A process of claim 1 wherein the reaction ratio of the components I -(1) and I -(3) is 0.01 to 10.0 mmol of the component I -(3) per gram of the component I -(1).

9. A process of claim 1 wherein the reaction ratio of the components I and II is 0.01 to 100 in terms of the component II /the component I -(3) in the component I (molar ratio).

10. A process of claim 1 wherein the Me in the general formula $Me(OR)_nX_{z-n}$ is Mg, Al, B or Si.

11. A process of claim 1 wherein the olefin is ethylene.

12. A process of claim 1 wherein the olefins are ethylene and an α-olefin having 3–12 carbon atoms.

13. A process of claim 1 wherein the organometallic compound is an organoaluminum compound.

14. A process of claim 1 wherein the organometallic compound is used together with an organic acid ester.

15. A process of claim 1 wherein the polymerization reaction is conducted at a temperature of 20° C. to 120° C. and a pressure of atmospheric pressure to 70 kg/cm².

16. A process of claim 1 wherein the polymerization is conducted in vapor phase.

17. A process of claim 1 wherein said silicon oxide is silica or a double oxide of silicon and at least one other metal selected from Group VII of the Periodic Table.

18. A process of claim 1 wherein $R^2$ in the general formula $R^2OH$ is a hydrocarbon group having 6 to 12 carbon atoms.

19. A process of claim 18 wherein the hydrocarbon group is a branched hydrocarbon group.

20. A process of claim 1 wherein the R in the general formula $Me(OR)_nX_{z-n}$ n is alkyl, aryl or aralkyl.

21. A process of claim 1 wherein the $R^1$ in the general formula $Ti(OR^1)_mX_{4-m}$ is alkyl, aryl or aralkyl.

22. A process of claim 1 wherein the $R^2$ in the general formula $R^2OH$ is alkyl, alkenyl, aryl or aralkyl.

23. A process of claim 1, wherein the $R^5$, $R^6$, $R^7$ and $R^8$ in the general formula $R^5_aR^6_bR^7_cSi(OR^8)_dX_{4-(a+b+c+d)}$ are independently alkyl, aryl or aralkyl.

24. A process for preparing a polyolefin by polymerizing or copolymerizing an olefin or olefins in the presence of a catalyst comprising a solid catalyst component and an organometallic compound, the solid catalyst compound being prepared by reacting the following components [I], [II] and [III];

I a reaction product obtained by the following components (1), (2) and (3) in the presence of a compound represented by the general formula $R^2OH$ wherein $R^2$ is a hydrocarbon radical having 1 to 20 carbon atoms or an organic radical containing an element selected from the group consisting of oxygen, nitrogen, sulfur, and chlorine:

(1) a silicon oxide and/or aluminum oxide;

(2) a reaction product obtained by reacting a magnesium halide and a compound represented by the general formula $Me(OR)_nX_{z-n}$ wherein Me is Mg, Al, B or Si, z represents the valence of the element Me, n is $0<n\geq z$, X is a halogen atom, and R is a hydrocarbon radical having 1 to 20 carbon atoms; and (3) a titanium compound represented by the general formula $Ti(OR^1)_mX_{4-m}$ wherein $R^1$ is a hydrocarbon radical having 1 to 20 carbon atoms, X is a halogen atom, and m is $0\geq m\geq 4$;

II an organoaluminum compound represented by general formula $Al(OR^3)_pR^4_qX_{3-(p+q)}$ wherein $R^3$ and $R^4$, which may be the same or different, are each a hydrocarbon radical having 1 to 24 carbon atoms, X is a halogen atom or hydrogen atom, and p and q are $0\geq p<3$, and $0\geq q\geq 3$, provided $0<p+q\geq 3$; and III a silicon compound represented by the general formula $R^5_aR^6_bR^7_cSi(OR^8)_nX_{4-(a+b+c+d)}$ wherein $R^5$, $R^6$, $R^7$ and $R^8$, which may be the same or different, are each a hydrocarbon radical having 1 to 20 carbon atoms, X is hydrogen or a halogen atom and a, b, c and d are $0\geq a<4$, $0\geq b\geq 4$, $0\geq c<4$ and $0<d\geq 4$, provided $0<a+b+c+d\geq 4$.

* * * * *

UNITED STATES PATENT AND TRADEMARK OFFICE
CERTIFICATE OF CORRECTION

PATENT NO. : 6,486,275 B2
DATED : November 26, 2002
INVENTOR(S) : Sano et al.

It is certified that error appears in the above-identified patent and that said Letters Patent is hereby corrected as shown below:

Column 20,
Line 26, "$0 \geq m \geq 4$" should be -- $0 \leq m \leq 4$ --
Line 32, "$0 \geq p < 3$, and $0 \geq q \geq 3$, provided $0 < p+q \geq 3$" should be -- $0 \leq p < 3$, and $0 \leq q \leq 3$, provided $0 < p+q \leq 3$ --
Line 38, "$0 \geq a < 4, 0 \geq b \geq 4, 0 \geq c < 4$ and $0 < d \geq 4$" should be -- $0 \leq a < 4, 0 \leq b \leq 4, 0 \leq c < 4$ and $0 < d \leq 4$, provided $0 < a+b+c+d \leq 4$ --

Column 22,
Line 20, "$0 \geq m \geq 4$" should be -- $0 \leq m \leq 4$ --
Line 27, "$0 \geq p < 3$, and $0 \geq q \geq 3$, provided $0 < p+q \geq 3$" should be -- $0 \leq p < 3$, and $0 \leq q \leq 3$, provided $0 < p+q \leq 3$ --
Lines 34-35, "$0 \geq a < 4, 0 \geq b \geq 4, 0 \geq c < 4$ and $0 < d \geq 4$, provided $0 < a+b+c+d \geq 4$" should be -- $0 \leq a < 4, 0 \leq b \leq 4, 0 \leq c < 4$ and $0 < d \leq 4$, provided $0 < a+b+c+d \leq 4$ --

Signed and Sealed this

Twenty-ninth Day of April, 2003

JAMES E. ROGAN
*Director of the United States Patent and Trademark Office*